No. 894,940. PATENTED AUG. 4, 1908.
L. BURG.
BALL BEARING FOR VEHICLE WHEELS.
APPLICATION FILED JAN. 13, 1908.
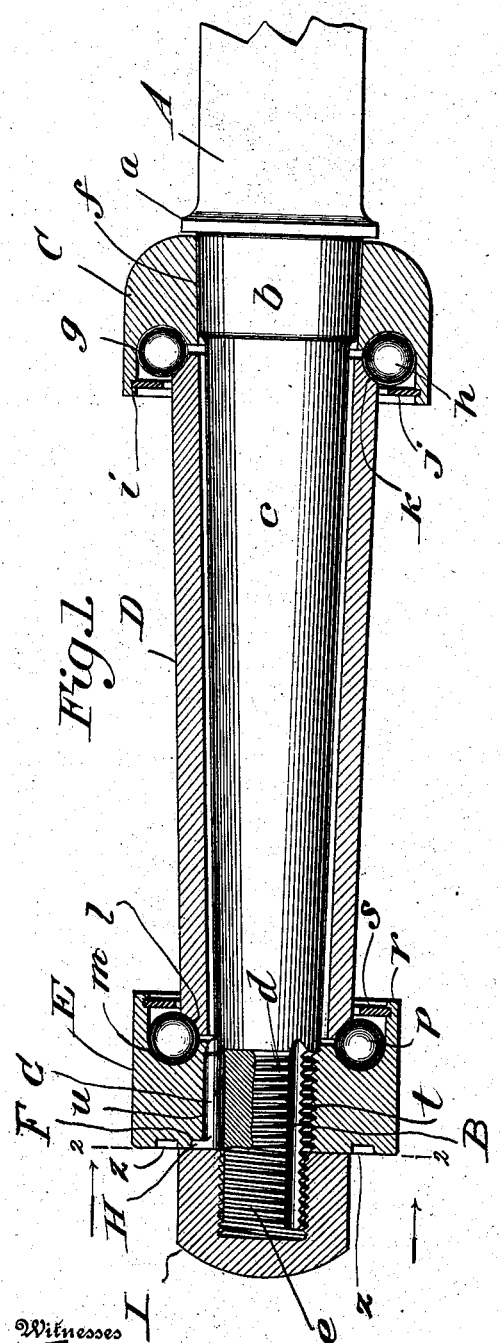
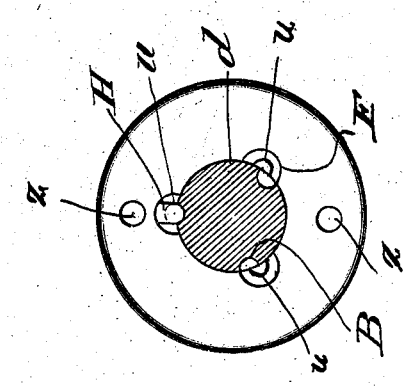
Inventor
Louis Burg.
Witnesses
Phil E. Barnes
J. J. Sheehy Jr.
By
James J. Sheehy
Attorney

UNITED STATES PATENT OFFICE.

LOUIS BURG, OF DALLAS CITY, ILLINOIS.

BALL-BEARING FOR VEHICLE-WHEELS.

No. 894,940.   Specification of Letters Patent.   Patented Aug. 4, 1908.

Application filed January 13, 1908. Serial No. 410,625.

*To all whom it may concern:*

Be it known that I, LOUIS BURG, citizen of the United States, residing at Dallas City, in the county of Hancock and State of Illinois, have invented new and useful Improvements in Ball-Bearings for Vehicle-Wheels, of which the following is a specification.

My invention pertains to ball bearings for vehicle wheels, and is designed more particularly as a practical improvement on the analogous ball bearing constituting the subject matter of my Letters-Patent No. 846,727, dated March 12, 1907.

The object of the present invention is to provide a ball bearing possessed of all of the advantages of the patented ball bearing, and one constructed with a view of assuring a large frictional contact between the nut and the ball cup so as to enable the nut to take a strong hold on the cup and of obviating the necessity of impairing the thread of the nut by counterboring the same.

With the foregoing in mind the invention will be fully understood from the following description and claims when the same are read in connection with the drawings, accompanying and forming part of this specification, in which:

Figure 1 is a view, partly in longitudinal section and partly in elevation, of my novel ball bearing. Fig. 2 is a transverse section taken in the plane indicated by the line 2—2 of Fig. 1; looking in the direction indicated by the arrows. Fig. 3 is a perspective view of the removable key comprised in my improvements.

Similar letters designate corresponding parts in all of the views of the drawings, referring to which:

A is the axle of the improved bearing. This axle is provided with the usual collar $a$, and is also provided with a spindle having a comparatively short tapered portion $b$ adjacent to the collar $a$ and a comparatively long tapered portion $c$ smaller in diameter than said tapered portion $b$.

I prefer to employ a spindle such as illustrated and just described for reasons hereinafter pointed out, but I do not desire to be understood as restricting myself to the use of the same inasmuch as the inner portion of my improved ball bearing may be constructed in the manner disclosed in my aforesaid Letters-Patent or in any other suitable manner without involving departure from the scope of my present invention as defined in the claims appended. The tapered portion $c$ of the axle spindle terminates at its outer end in a portion $d$ threaded in one direction, and the said threaded portion $d$ terminates, in turn, in a reduced portion $e$ threaded in the opposite direction. Formed in and extending longitudinally of the said threaded portions $d$ and $e$ are three (more or less) equidistant grooves B which are preferably of semicircular form in cross-section and are for a purpose hereinafter set forth.

C is the inner cup of the bearing which may be fixed with respect to the axle in any approved manner without affecting my present invention. I prefer, however, to provide the said cup with a bore $f$ tapered correspondingly to and adapted to receive the tapered portion $b$ of the axle spindle, this being advantageous inasmuch as it permits of the cup being expeditiously put on the spindle in a tight and true manner and also because it does not entail weakening of the cup. The said cup C is provided in its outer side with a groove $g$ designed to form a race for a circular series of anti-friction balls $h$; and it is also provided at its outer edge with a shallow flange $i$ within which is arranged a split ring $j$ the office of which is to remove the liability of any of the balls being lost when the axle box is removed from the spindle.

D is the axle box. The said box loosely surrounds the spindle so that clearance is afforded between the two; and it is provided at its inner end with a circular channel $k$ to bear against the balls $h$ and is also provided at its outer end with a circular channel $l$ for a similar purpose E is the removable combined cup and nut of my improved bearing. The said cup and nut is provided with a groove $m$ to receive a circular series of anti-friction balls $p$ and also has a flange $r$ at its inner edge within which is retained a split ring $s$ for retaining the balls in the groove $m$. Interior threads $t$ are provided in the combined cup and nut to engage the threaded portion $d$ of the spindle, and in said cup and nut three (more or less) equidistant longitudinal grooves $u$ are formed which grooves interrupt the thread $t$ and terminate at their outer ends in comparatively large countersinks F, best shown in Fig. 2. The grooves $u$ are preferably of semicircular form in cross-section, and one of the said grooves when registered with a groove B of the spindle is designed to receive the removable key G shown in Figs. 1 and 3, the office of which is to lock the combined cup and nut to the spindle and in that way preclude casual movement of the former on the latter, and the consequent locking of the box D to the spindle. At its outer end the key G is provided with a lateral projection H and this latter is designed when the key is positioned as shown in Fig. 1, to rest in one of the countersinks F in the outer face of the combined cup and nut so as to assure the outer end of the key being flush with the said outer face. At this point it will be noticed that spaces are provided in the countersinks F at the sides of the projection H on the key G, and consequently when it is desired to withdraw the key the said projection H may be readily grasped with a suitable implement for the purpose.

I is a nut interiorly threaded to engage the outer threaded portion e of the spindle. The said nut I is preferably, though not necessarily, hexagonal in form, and its inner end is disposed parallel to the outer face of the cup and nut E and is adapted to frictionally engage the said outer face throughout the area of the inner end of the nut, with the result that the nut is calculated to strongly hold the combined cup and nut against casual movement. It will also be noted that the nut I bears against the outer end of the key G and precludes casual displacement of the latter, and that the provision of the countersinks F in the outer face of the combined cup and nut E obviates the necessity of counterboring or otherwise weakening the nut I.

When the parts of my improvements are relatively arranged as shown in Fig. 1 it will be manifest that casual movement of the combined cup and nut E on the spindle is precluded, and hence there is no liability of said combined cup and nut becoming casually set against the box D and in that way locking the said box to the spindle, but it will also be manifest that when it is desired to remove the box D and the wheel in which the same is arranged from the spindle, the same may be quickly and easily accomplished after the nut I, the key G and the combined cup and nut E are removed in the order named from the spindle.

A plurality of longitudinal grooves are provided in the spindle and in the combined cup and nut E in order to assure registration of at least two of the said grooves when the combined cup and nut E is correctly positioned on the spindle.

As shown in Fig. 2, the combined cup and nut E is preferably circular in form, and I therefore prefer to provide the said cup and nut in its outer face with recesses z for the engagement of a spanner through the medium of which the cup and nut may be turned as occasion demands.

It will be gathered from the foregoing that my improvements contribute materially to the strength and durability of the ball bearing, and yet do not render the bearing difficult to make or expensive.

The construction herein shown and described constitutes the best embodiment of my invention of which I am aware, but it is obvious that in the future practice of the invention such changes or modifications may be made as fairly fall within the scope of my invention as defined in the claims appended.

Having described my invention, what I claim and desire to secure by Letters-Patent, is:

1. In a ball bearing for vehicle wheels, the combination of an axle spindle having a portion adjacent to its outer end on which is a thread extending in one direction, and a reduced portion at its outer end on which is a thread extending in the opposite direction, and also having longitudinal grooves in the said threaded portions, a box arranged on the spindle, a combined cup and nut having a threaded bore to receive the inner threaded portion of the spindle and also having longitudinal grooves in the wall of said bore and countersinks in its outer side or face communicating with the outer ends of the grooves, balls between the box and the combined cup and nut, a key removably arranged in opposed grooves of the spindle and combined cup and nut and having a lateral projection at its outer end arranged in one of the countersinks of the latter and flush with the outer face thereof, and a nut turned on the reduced and threaded end of the spindle and arranged to retain the key in position; said nut having an inner side arranged parallel with and adapted to frictionally engage the face of the combined cup and nut throughout the area of the inner end of the nut.

2. In a ball bearing for vehicle wheels, the combination of an axle spindle having an inner tapered portion and an outer tapered portion smaller in cross-section than the inner portion and also having a portion adjacent to its outer end on which is a thread extending in one direction, a reduced portion at its outer end on which is a thread extending in the opposite direction and longitudinal grooves in the said threaded portions, a cup having a tapered bore receiving the inner tapered portion of the spindle, a box arranged on the spindle, balls interposed between said cup and box, a combined cup and nut having a threaded bore to receive the inner threaded portion of the spindle and also having longitudinal grooves in the wall of said bore and countersinks in its outer face communicating with and larger than the outer ends of the grooves, balls between the box and the combined cup and nut, a key removably arranged in opposed grooves of the spindle and combined cup and nut and having a lateral projection at its outer end arranged in one of the countersinks of the latter and flush with the outer face thereof, and a nut turned on the reduced and threaded end of the spindle and having an inner end arranged throughout its area to frictionally engage the outer face of the combined cup and nut.

3. In a ball bearing for vehicle wheels, the combination of an axle spindle having a portion adjacent to its outer end on which is a thread extending in one direction and a reduced portion at its outer end on which is a thread extending in the opposite direction; the said threaded portions being longitudinally grooved, a combined cup and nut having a threaded and longitudinally grooved bore to receive the inner threaded end of the spindle and also having a countersink in its outer face larger than and communicating with the outer end of the groove, a key removably arranged in opposed grooves of the spindle and combined cup and nut and having a lateral projection at its outer end arranged in the countersink of the nut and flush with the outer face thereof, and a nut turned on the reduced and threaded end of the spindle and having an inner end arranged throughout its area to frictionally engage the outer face of the first mentioned nut.

4. In a ball bearing for vehicle wheels, the combination of an axle spindle having an inner tapered portion and an outer tapered portion smaller in cross-section than the inner portion and also having a longitudinally grooved and threaded end portion, a cup having a tapered bore receiving the inner tapered portion of the spindle, a box arranged on the spindle, balls interposed between said cup and box, a ball cup interiorly threaded to receive the threaded portion of the spindle and interiorly grooved and having countersinks or recesses in its outer face and in communication with its grooves, balls interposed between said cup and the box, a key removably arranged in registered grooves of the spindle and cup and having a head at its outer end disposed in one of the recesses or countersinks of the cup and flush with the outer face thereof, and a nut removably arranged on the threaded portion of the spindle and against the cup and key.

In testimony whereof I have hereunto set my hand in presence of two subscribing witnesses.

LOUIS BURG.

Witnesses:
W. H. BLISS,
P. E. WALTER.